United States Patent [19]
Wollny

[11] Patent Number: 5,680,048
[45] Date of Patent: Oct. 21, 1997

[54] MINE DETECTING DEVICE HAVING A HOUSING CONTAINING METAL DETECTOR COILS AND AN ANTENNA

[75] Inventor: Walter Thomas Wollny, Reno, Nev.

[73] Assignee: Net Results, Inc., Reno, Nev.

[21] Appl. No.: 699,353

[22] Filed: Aug. 19, 1996

[51] Int. Cl.[6] .............................. G01L 3/08; G01L 3/12; G01S 11/00; G01S 13/00
[52] U.S. Cl. .............................................. 324/329; 342/22
[58] Field of Search ................................. 324/326, 327, 324/328, 329; 342/22, 52, 459

[56] References Cited

U.S. PATENT DOCUMENTS

| | | |
|---|---|---|
| 3,307,187 | 2/1967 | Horst . |
| 3,775,765 | 11/1973 | Di Piazza et al. . |
| 4,072,942 | 2/1978 | Alongi . |
| 4,698,634 | 10/1987 | Alongi et al. . |
| 5,307,272 | 4/1994 | Butler et al. . |

FOREIGN PATENT DOCUMENTS 60-233584  11/1985  Japan .

OTHER PUBLICATIONS

Proceedings of the International Electronic Crime Countermeasures; Edinburgh, Scotland; 18–20 Jul., 1973; Alongi. The Use of Radar in Geophysical Prospecting; Radar Conference; London, England; 25–28 Oct., 1977; Daniels.

*Primary Examiner*—Walter E. Snow
*Attorney, Agent, or Firm*—Richard C. Litman

[57] ABSTRACT

A device detects metallic and non-metallic objects on, flush with, or covered by the ground or other surfaces, or by interfering or obscuring structures or surfaces, using ground penetrating radar, a metal detector and a radiometer. It is specifically designed for detection of non-metallic mines. The coils of the metal detector are mounted in a multi-sensor module with the radar antenna in a co-boresighted and/or co-located arrangement, without degrading the performance of the metal detector or the ground penetrating radar. Preferably, the ground penetrating radar uses a feed and a collimation lens, (such as a Luneberg or Step Dielectric lens), as an antenna to reduce the change in the loss of signal strength due to changes in distance between the surface and the antenna, (for short distances). The collimated beam has approximately constant power for distances closer than twice the diameter of the lens. By using the lens with a ground penetrating radar, the antenna can be held somewhat farther from the ground, as well as eliminating "clutter" introduced as the antenna moves closer and farther from the ground. The sensor for the radiometer is co-located in the multi-sensor module. The sensors selected for the multi-sensor module employ different detection phenomena. Therefore, each sensor has its unique source for false alarms. The sensors' independent phenomenologies provide a synergism, which when processed, achieve an increase in probability of detection concurrent with a reduction in the false alarm rate for mines.

20 Claims, 8 Drawing Sheets

MINE DETECTING DEVICE HAVING A HOUSING CONTAINING METAL DETECTOR COILS AND AN ANTENNA

BACKGROUND OF THE INVENTION

1. Field of the Invention

The present invention relates to a surface penetrating object detection system including a ground penetrating radar, in combination with a metal detector and/or a radiometer, for detecting objects on, flush with, below or behind a surface. A further embodiment of the invention includes the ground penetrating radar with a near-field collimated beam antenna.

2. Description of the Prior Art

Several systems for detecting objects below a surface are known. U.S. Pat. No. 3,775,765, (Di Piazza et al.), discloses a ground penetrating radar employing an antenna assembly in contact with the ground and having an impedance approximately equal to that of the ground. A dielectric lens is employed for coarse antenna to ground impedance matching. U.S. Pat. Nos. 4,072,942, (Alongi), and 4,698,634, (Alongi et al.), show ground penetrating radars using non-dispersive antennas. U.S. Pat. No. 5,307,272, (Butler et al.) shows a ground penetrating radar and a metal detector mounted on the same platform, and this patent is incorporated herein by reference. Japanese Patent 233,584 discloses the use of radar and a magnetic sensor on the same platform to detect an underground object. The Proceedings of the International Electronic Crime Countermeasures, 18–20 Jul., 1973, discusses the use of short-pulse, high-resolution radar to detect bodies buried in soil. The paper on *The Use of Radar in Geophysical Prospecting*, 25–28 Oct., 1977, discusses the use of radar for detection and location of subsurface strata. U.S. Pat. No. 3,307,187, (Horst), discloses the use of a Luneberg lens as a radar reflector.

None of the above inventions and patents, taken either singly or in combination, is seen to describe the instant invention as claimed.

SUMMARY OF THE INVENTION

The instant invention is a device that can detect metallic and non-metallic objects on, flush with, or below the ground or other surfaces using a ground penetrating radar system, a metal detector system, and a radiometer supported by a wand raised above a ground surface. While there are a number of uses for the present invention, (locating pipes, voids under pavement, steel beams and other internal structures in buildings, steel rods in concrete, leaks, etc.), one of the most critical areas of use is the detection of land mines. The United Nations estimates there are more than 100 million mines distributed throughout the world. The mine detection state of practice is to use metal detectors to detect mines. Unfortunately, there is an increasing number of non-metallic mines that are not detectable by metal detectors and many mine infested areas are littered with small bits of metal which cause large numbers of false alarms rendering useless the metal detector at full sensitivity. Reducing the sensitivity to reduce the false alarm rate results in the detection of only the large metal mines; hence, small plastic mines remain undetected. Recently, ground penetrating radar systems have been used to assist in the detection of non-metallic mines.

The surface penetrating object detection system of the present invention uses a metal detector for detecting metal objects (mines), in combination with a ground penetrating radar. Contained within a multi-sensor module is the radar antenna co-boresighted and/or co-located with the metal detector coils. The terms co-boresighted and co-located have specific meanings in the context of the present invention. Co-boresighting the metal detector coils with the radar antenna aligns both sensors so that the center of their respective fields of view are pointed at the same location. Co-locating the metal detector coils with the radar antenna places the coils and antenna in basically the same space, (see FIGS. 3–9).

By co-locating the metal detector coils with the radar antenna, the overall size of the multi-sensor module can be relatively small and, therefore, lighter with improved balance. This co-location also helps to reduce any electronic position translation that is necessary, when the sensors are not co-boresighted. It should be noted that simply placing the metal detector coils and the radar antenna on the same platform is not co-location in the sense meant here. Co-location here means that the metal detector coils and the radar antenna are physically aligned on the same axis, and therefore have vertically aligned centers of gravity thus improving stability for hand held operation. The metal detector measures the change in the magnetic field caused by the eddy currents induced into any metal within the metal detector's field of view. Therefore, the metal detector's peak response, at the center of the coils, coincides with the radar's peak response that occurs at the same location, which improves target location accuracy, improves the detection of weak signals, and reduces the false alarm rate.

When the metal detector coils are co-located with the radar antenna, but not co-boresighted, the internal circuitry of the system uses an input from a wand position and velocity sensor to translate the radar and metal detector signals for positional coincidence. It should be noted that the ground penetrating radar antenna should contain a minimum of metal content to be co-boresighted with the metal detector, without reducing the metal detector's performance. This is achieved by using non-conductive material wherever possible, (antenna housing, mounting brackets, element support, and rf absorber). Printed circuit radiating elements made of thin rf conductive materials are used to minimize the antenna's metal content. The smaller the antenna's metal content the smaller the antenna's impact is on the metal detector's sensitivity. The metal detector can also have a balance adjustment that accommodates a small fixed amount of nearby conductive material without significant reduction in sensitivity.

Most ground penetrating radar systems use an antenna that must be maintained at a constant distance away from the surface being scanned to avoid affecting the radar signal. When searching for mines, placing the wand too close to the ground can detonate some mines by striking the firing pins of these mines that penetrate through the ground's surface, (Valmara Mine). The signal strength of the radar drops off at a rate of $1/R^4$, and therefore the movement to and from the surface affects the reflected radar signal, thereby masking the presence of an object on, flush with, or below the surface.

One embodiment of the present invention overcomes this problem by using a ground radar that has a collimated beam antenna. An implementation to achieve near field collimation employs an antenna feed and a lens (such as a Luneberg or Step Dielectric lens) as an antenna to reduce the change in loss of signal strength caused by changes in the distance between the surface and the antenna (for short distances). The collimated beam has nearly constant power for distances closer than twice the diameter of the lens, but transitions to the $1/R^4$ power loss as the distance increases beyond twice the diameter. By using the antenna having a feed and lens, with a ground penetrating radar, the antenna can be held somewhat farther from the surface, as well as reducing the "clutter" produced as the antenna moves closer to and farther from the ground. The spherical lens implementation to achieve collimation also provides the ability to generate multiple beams. The radar beams can be "steered" by positioning the radar feed(s) at different points on the lens' surface. It should be noted that the radar beam(s) extend from the feed(s), through the center of the lens and out of the lens at a point directly opposite the feed(s).

The surface penetrating object detection system of the present invention may also include a microwave radiometer which measures the change in the reflected sky temperature. The sky temperature at microwave frequencies is about 20 to 30 degrees Kelvin. Man-made objects tend to provide specular reflection of the sky temperature, while the ground's surface provides diffused reflection of the sky temperature. Man-made objects are, therefore, observed as colder than the surrounding environment. The radiometer antenna is co-located within the multi-sensor module. The microwave radiometer is useful only for operations where unobstructed sky illumination is present. The radiometer will not function in a cave, a basement, or similar environments.

The multi-sensor module is designed to be mounted on the end of a wand for hand held mine detection operations, on the end of a robotic arm for remotely controlled mine detection operations, or in an array configuration on a vehicle for road clearing operations. The sensors selected for the multi-sensor module employ different detection phenomena. Therefore, each sensor has its unique source for false alarms. The sensors' independent phenomenologies provide a synergism, which when processed, achieves an increase in probability of detection concurrent with a reduction in the false alarm rate for mines. The invention thereby integrates multiple sensors into a compact detection module for the detection and resolution from above the surface of both metallic and non-metallic objects on, flush with, or below the surface. The surface can be the ground or any other material having constitutive properties that are sensor compatible.

Accordingly, it is a principal object of the invention to save lives and property by providing a device for accurately detecting metallic and non-metallic mines on, flush and below a surface.

It is another object of the invention to provide a device for accurately detecting metallic with, or non-metallic objects on, flush and below a surface, with, or/or obstructed by an interfering surface.

It is still another object of the invention to reduce false alarms while searching for these objects.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
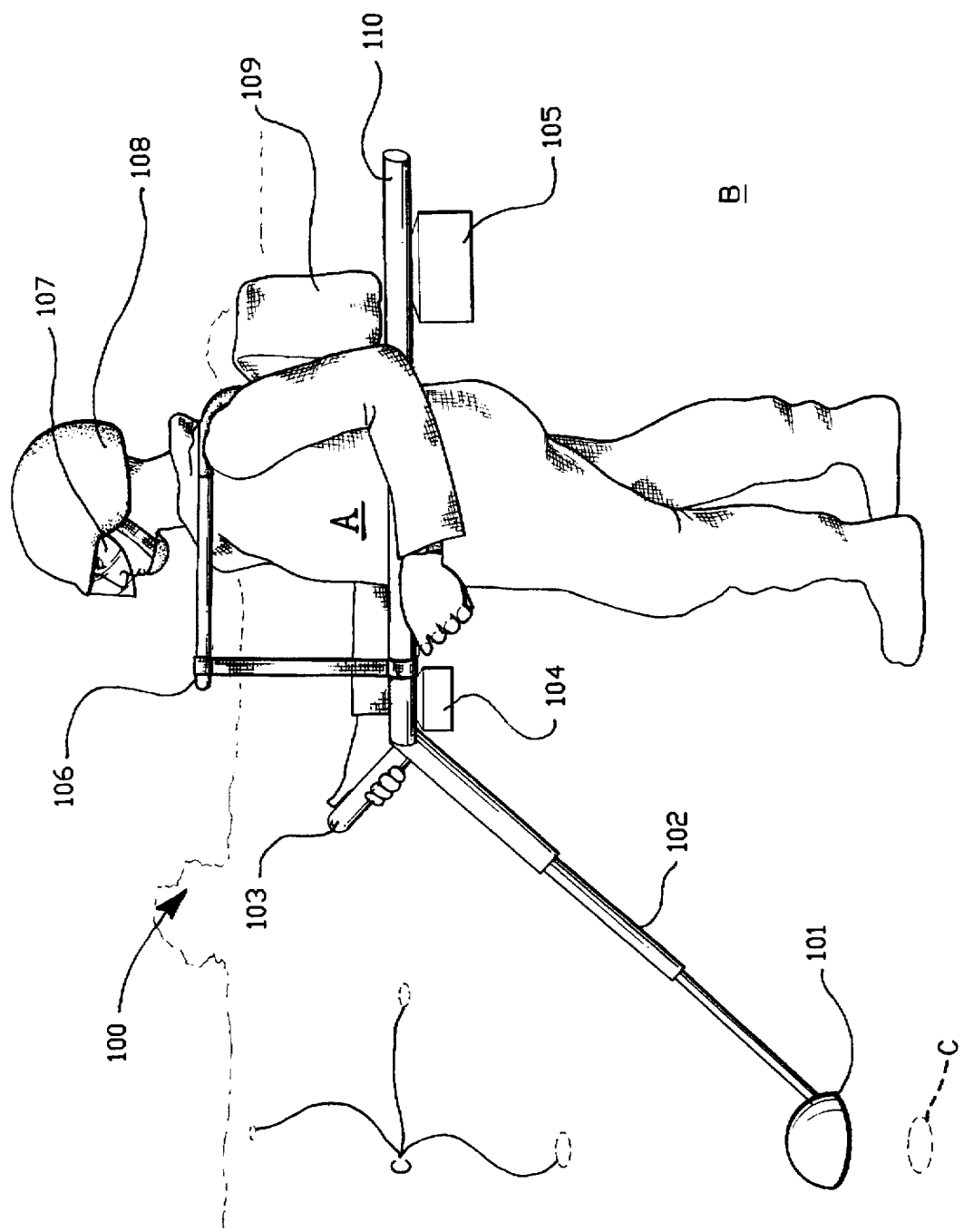
FIG. 1 is an environmental view of the surface penetrating object detection system of the present invention, being carried by a person to scan an area of the ground for metallic and non-metallic objects.

FIG. 1 shows a person A using the surface penetrating object detection system 100 to locate an object, or mine C, under surface B. The surface penetrating object detection system 100, includes a telescoping wand 102 that allows the user A to hold a multi-sensor module 101 relatively close to the ground. A handle 103 is provided for increased stability. A strap and support bar configuration 106, help to support the weight of the system and thereby reduce the user's fatigue, for long-term operations. A control box 104 contains the various controls for the system, (status indicators, speaker or headset volume, etc.). Enclosure 105 contains the circuitry for the ground penetrating radar. Enclosure 105 can be moved fore and aft on bar 110 to balance the system on support 106. Ideally, this balance will cause the module 101 to raise slightly higher off the ground when the operator A removes his hands from the handles. This is important in that inadvertently allowing the module 101 to touch the ground B could result in detonating a mine on, flush with, or below the ground's surface. The user A then sweeps the module 101 over the area to be searched, and monitors the system's output visually, via indicator lights or a liquid crystal display (LCD) mounted on control box 104, or via a liquid crystal heads up goggles 107. The user A can also monitor the system's output aurally, via earphones 108, (hidden here by the helmet), or a speaker (located in backpack 109). Also located in backpack 109 are the batteries, the system's computer and power conditioning circuitry.

Figure 11:
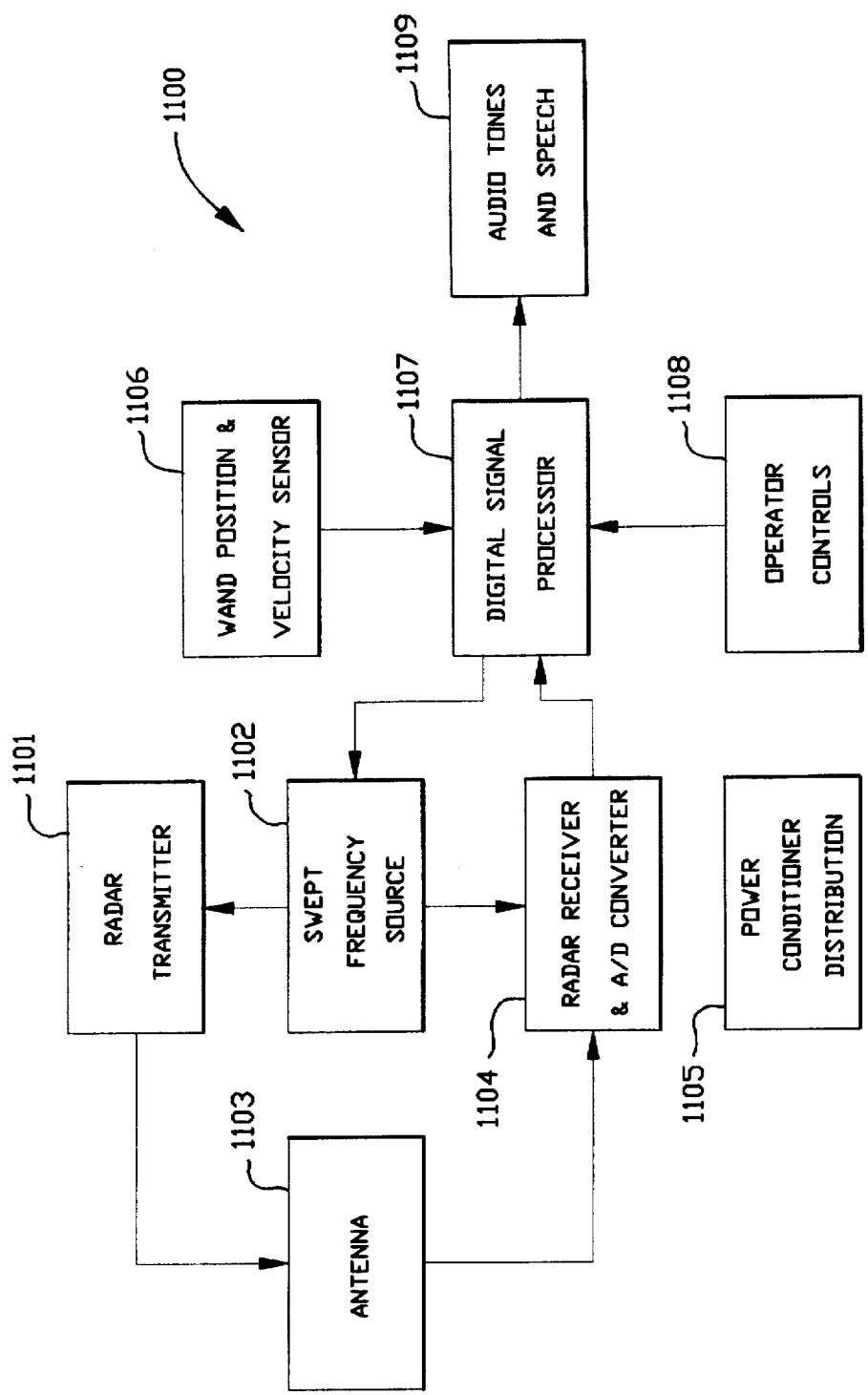
FIG. 11 is a block diagram of a conventional ground penetrating radar system.

FIG. 11 is a block diagram of a conventional ground penetrating radar system 1100. The digital signal processor 1107, receives information from the wand position and velocity sensor 1106, the operator controls 1108, and the radar receiver 1104. The digital signal processor 1107 also controls the swept frequency source 1102, and provides an output via audio tones or synthesized speech generator 1109, which in turn generates the appropriate output. The swept frequency source 1102 provides control and synchronizing signals to the radar transmitter 1101 and the radar receiver 1104. The power condition distribution 1105 provides the necessary power supply voltages to the different circuits in the system. The conventional antenna 1103 used in conventional ground penetrating radar systems (dipoles, spirals, horns, log periodic, etc.) may be a single antenna for both transmitting or receiving, or may include an antenna for transmitting and a separate antenna for receiving. As the operation of conventional ground penetrating radar systems is well known, a complete description of the operation is not deemed necessary.

Figure 2:
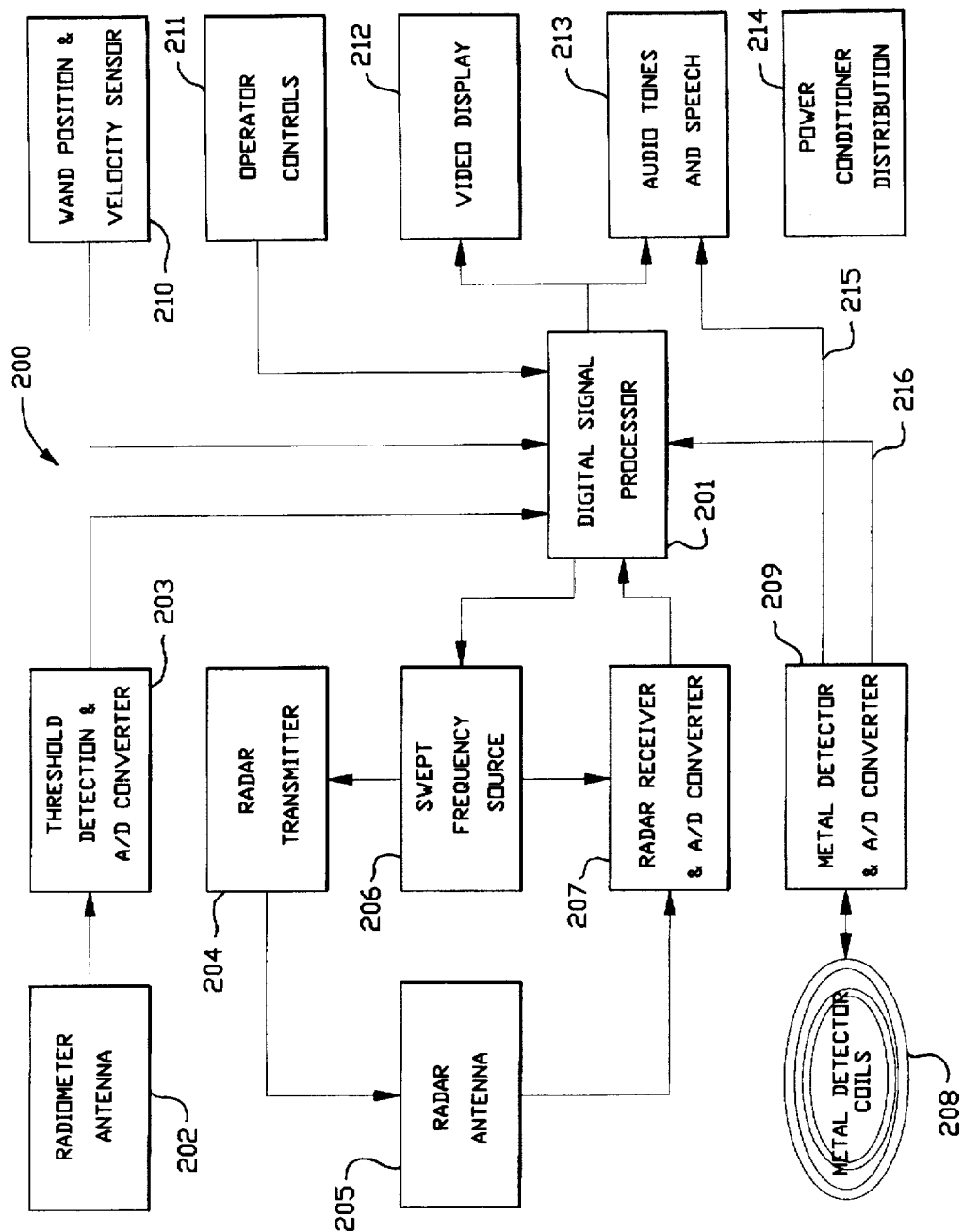
FIG. 2 is a block diagram of the surface penetrating object detection system of the present invention.

FIG. 2 is a block diagram of the surface penetrating object detection system 200. The surface penetrating object detection system of the present invention includes a ground penetrating radar system that has several of the same components as the conventional system in FIG. 11. These include: a wand position and velocity sensor 210; a swept frequency source 206; a radar transmitter 204; a radar receiver 207; and a power condition distribution 214.

While the radar system shown is a stepped CW type, other radar types can be implemented these include: impulse; pulse; Swept FM; and CW. Any of these types can be in either a co-polarization or cross polarization implementation. While the radar configuration shown is monostatic, other configurations can be implemented including: Bistatic; Balance Bridge; etc. While the antenna(s) shown are of a single frequency band and polarization, other types can be implemented including: multiple linear; multiple elliptical; multiple circular polarization; and these may include single or multiple frequency bands.

The digital signal processor 201 includes additional circuitry for processing the metal detector and radiometer inputs, as well as additional control inputs for these devices input from the operator controls 211. The digital signal processor 201, integrates the inputs from the radiometer, radar and metal detector to provide a more accurate object detecting method. The output of the digital signal processor 201 is applied to the video display 212 and the audio tones and speech 213.

The radar antenna 205, used in the present invention, may be either a conventional ground radar antenna, as discussed above, or in the preferred embodiment, a collimation beam antenna that is discussed in greater detail below.

The radiometer antenna 202 (which may be integrated with the radar antenna as discussed below) provides a signal to the threshold detection and A/D converter circuit 203 that conditions and digitalizes this signal for input to the digital signal processor 201.

Metal detector coils 208 and the metal detector and A/D converter 209 supply a digital input signal on line 216 to the digital signal processor 201, as well as an analog signal on line 215 to the audio tones and speech circuit 213 for standard metal detector operation.

Figure 3:
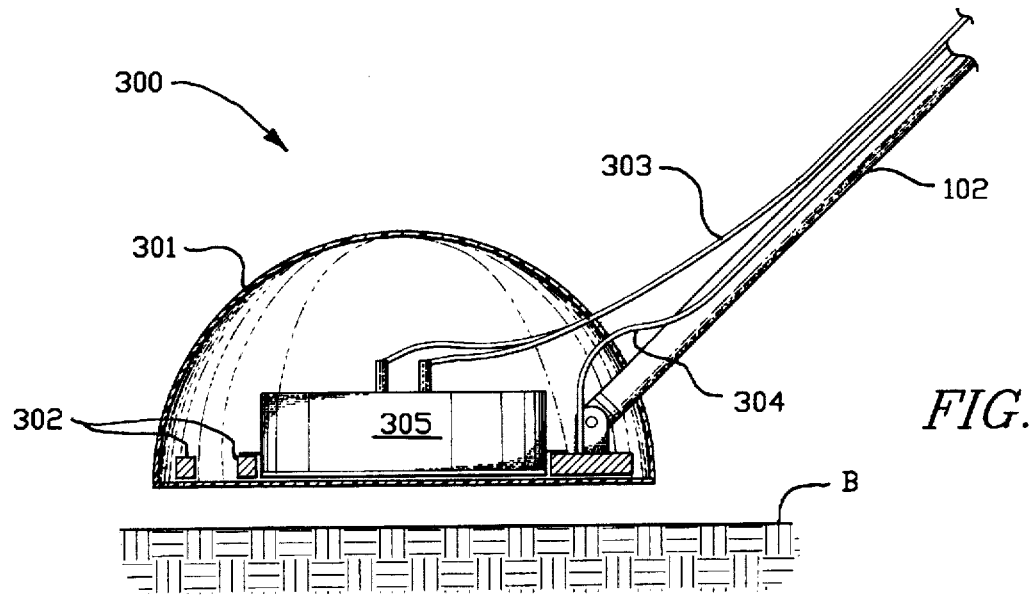
FIG. 3 is a side elevational view of the multi-sensor module in accordance with the present invention, showing a cross polarized dipole radar antenna co-boresighted with metal detector coils.

FIG. 3 shows a first embodiment of the multi-sensor module 300, including a plastic hemispherical protective cover 301, metal detector coils 302, a cross polarized dipole antenna 305, radar antenna feed lines 303, and metal detector feed lines 304. As can be seen the radar antenna and metal detector coils are both co-located and co-boresighted. The antenna and coils are concentric, and therefore, their line of sight is coincident.

Figure 4:
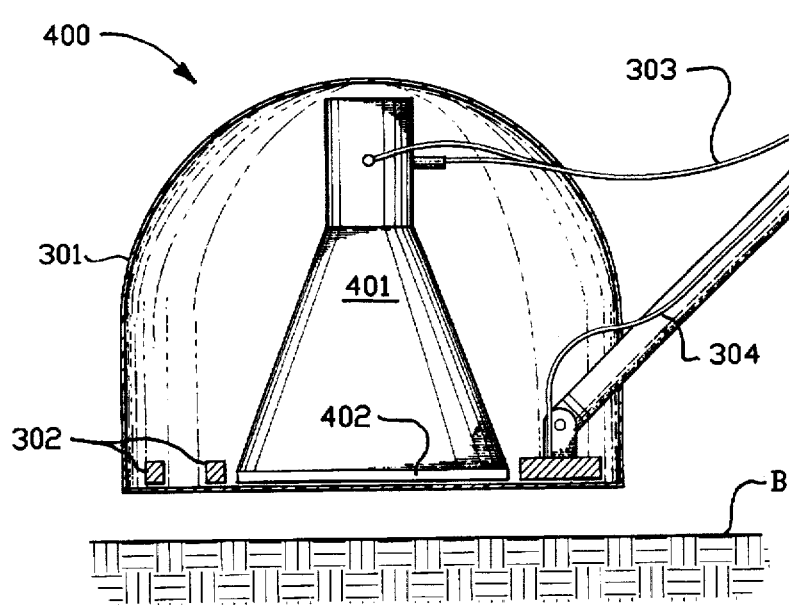
FIG. 4 is a side elevational view of the multi-sensor module in accordance with a second embodiment of the present invention, showing a dual polarized conical horn with lens radar antenna co-boresighted with the metal detector coils.

FIG. 4 shows a second embodiment of the multi-sensor module 400, which also includes the plastic hemispherical protective cover 301, metal detector coils 302, radar antenna feed lines 303, and metal detector feed lines 304. The radar antenna in this embodiment, however, is a dual polarized conical horn 401 with lens 402. As in the first embodiment, the radar antenna and metal detector coils are both co-located and co-boresighted.

Figure 5:
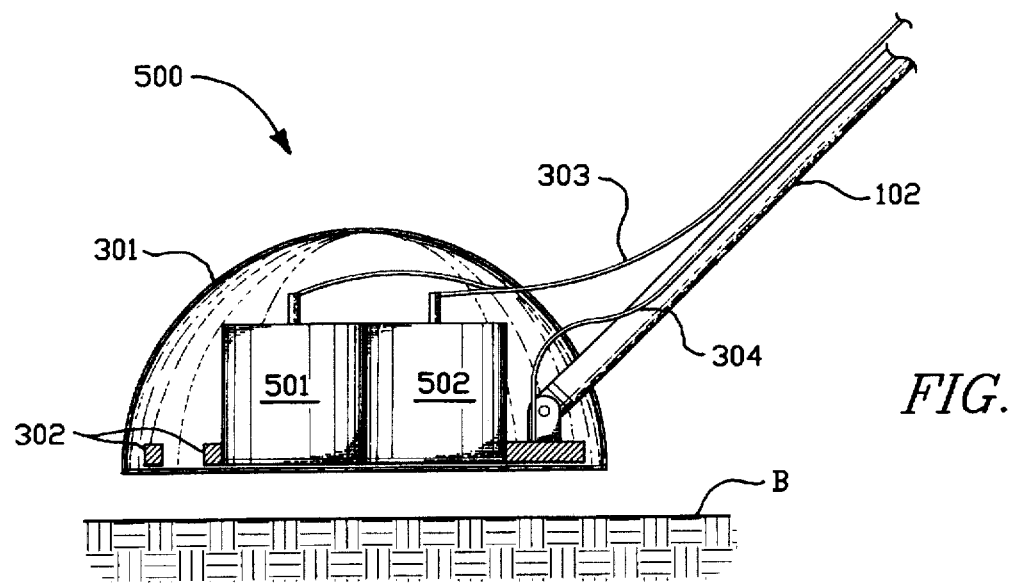
FIG. 5 is a side elevational view of the multi-sensor module in accordance with a third embodiment of the present invention, showing two (2) four arm log spiral radar antennas co-boresighted with the metal detector coils.

FIG. 5 shows a third embodiment of the multi-sensor module 500, which also includes the plastic hemispherical protective cover 301, metal detector coils 302, radar antenna feed lines 303, and metal detector feed lines 304. The radar antenna in this embodiment, however, is two, circularly polarized, four arm, log spiral antennas 501 and 502. As in the first embodiment, the radar antenna and metal detector coils are both co-located and co-boresighted.

Figure 6:
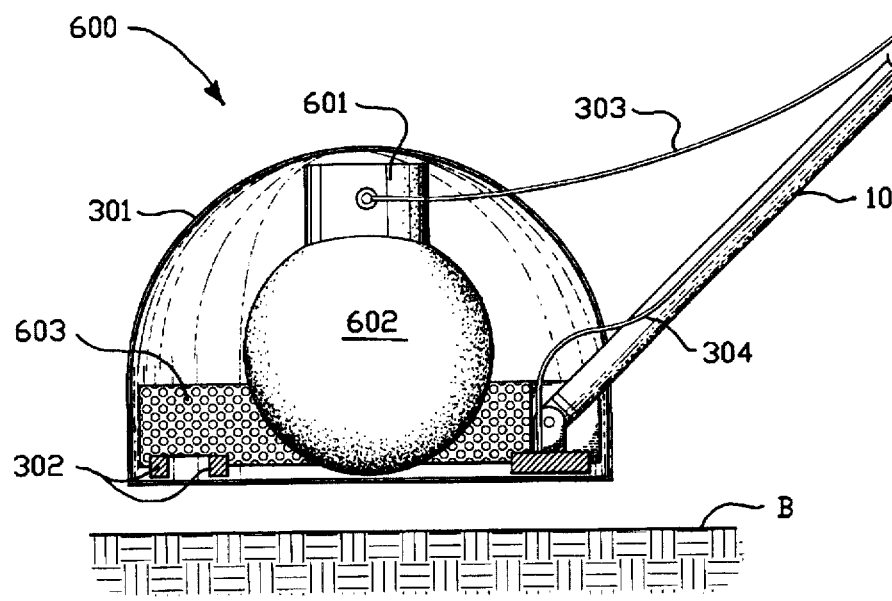
FIG. 6 is a side elevational view of the multi-sensor module in accordance with a fourth embodiment of the present invention, showing a single feed spherical lens collimated beam radar antenna co-boresighted with the metal detector coils.

FIG. 6 shows a fourth embodiment of the multi-sensor module 600, which also includes the plastic hemispherical protective cover 301, metal detector coils 302, radar antenna feed lines 303, and metal detector feed lines 304. The radar antenna in this embodiment, however, is a single feed 601, spherical lens 602 antenna, and polystyrene low loss microwave foam lens support and spacer 603. The single feed 601 is placed directly on top of the spherical lens 602. This results in the radar field of view being directed downward, and therefore, as in the first embodiment, the radar antenna and metal detector coils are both co-located and co-boresighted.

Figure 7:
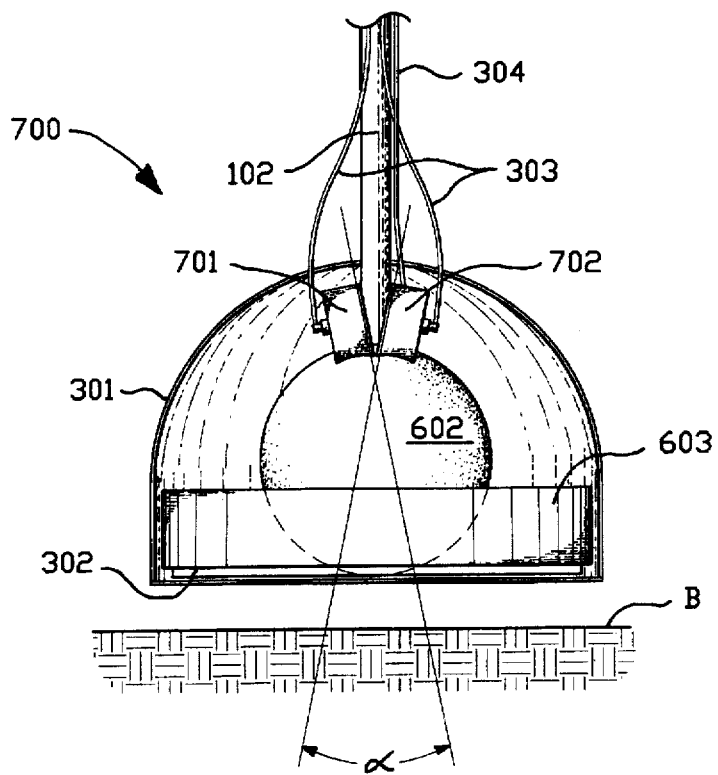
FIG. 7 is a front view of the multi-sensor module in accordance with a fifth embodiment of the present invention, showing a dual feed spherical lens collimated beam radar antenna co-located with the metal detector coils.

FIG. 7 shows a fifth embodiment of the multi-sensor module 700, which also includes the plastic hemispherical protective cover 301, metal detector coils 302, radar antenna feed lines 303, and metal detector feed lines 304. The radar antenna in this embodiment, however, is a dual feed, 701 and 702, spherical lens 602 antenna with the foam lens support and spacer 603. The dual feeds' lines of sight are offset from each other by angle α. As the dual feed creates two distinct radar lines of sight, the radar antenna and metal detector coils are not co-boresighted. The radar antenna and metal detector coils in this embodiment are, however, co-located. The electronic circuitry in the digital signal processor 201 aligns these signals electronically when the feeds are operating at the same frequency, (mono-pulse configuration), and when the feeds are operated at different frequencies the alignment processor also uses the input from the wand position and velocity sensor 210.

Figure 8:
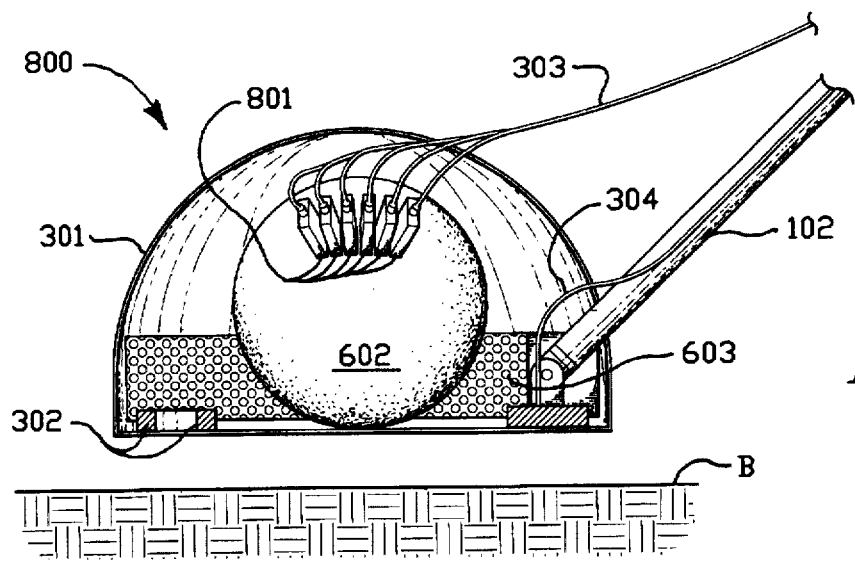
FIG. 8 is a side elevational view of the multi-sensor module in accordance with a sixth embodiment of the present invention, showing a six feed spherical lens collimated beam, radar or radiometer antenna co-located with the metal detector coils.
Figure 9:
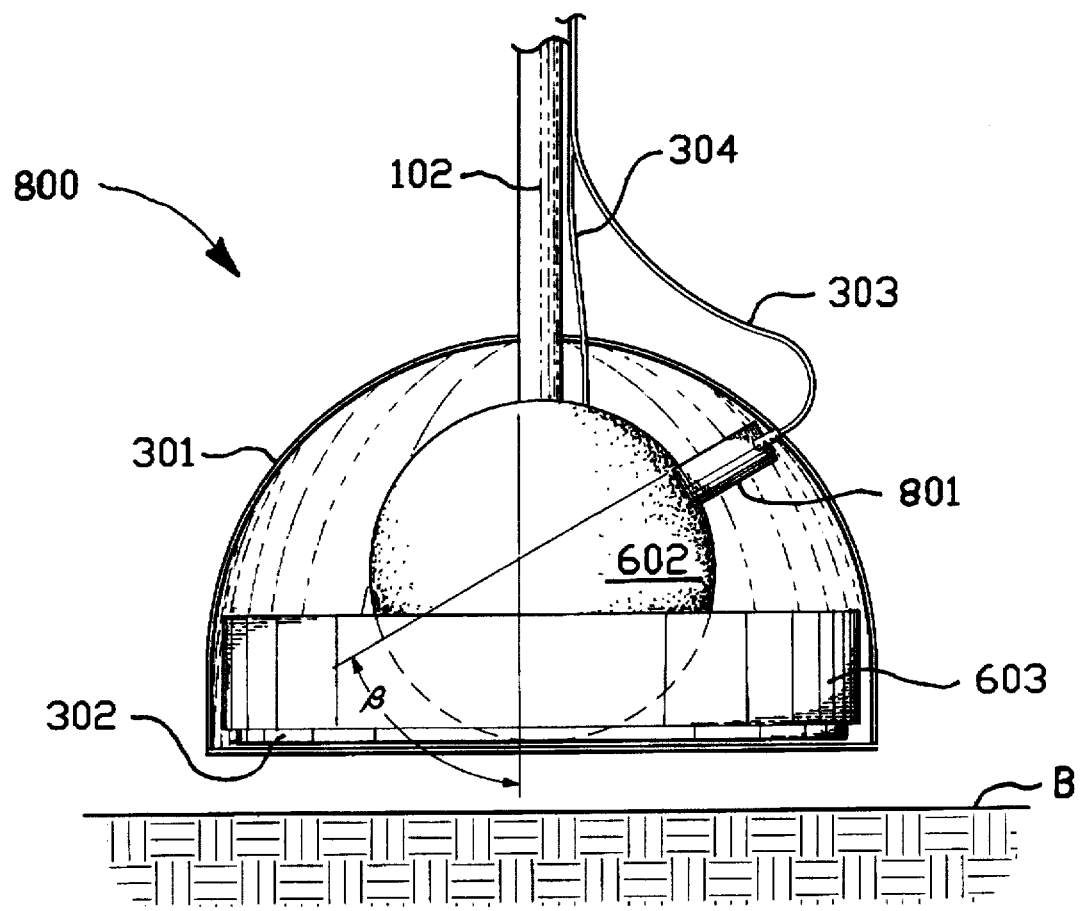
FIG. 9 is a front view of the multi-sensor module of FIG. 8.

FIG. 8 shows a sixth embodiment of the multi-sensor module 800, which also includes the plastic hemispherical protective cover 301, metal detector coils 302, radar antenna feed lines 303, and metal detector feed lines 304. The radar antenna in this embodiment, however, is a six feed, 801, spherical lens 602 antenna, and the foam lens support and spacer 603. The six feeds' lines of sight are arranged in an angular offset array that creates a "footprint" on the ground of an array of six contiguous beams perpendicular to the scan direction. A typical value of the angular offset between the two outside feeds is 33.4°, with the inside feeds equally spaced between them. The angular offset and number of feeds can be changed depending on the footprint desired. As best seen in FIG. 9, all of the feeds are offset from the vertical by angle β. This offset is useful, as these feeds are used with the radiometer to allow the reflected sky temperature to be sensed without the sensor module "shading" the scanned area. As the six feeds create six distinct beams, the radar antenna and metal detector coils are not co-boresighted. The radar antenna and metal detector coils in this embodiment are, however, co-located.

While the collimation device shown in FIGS. 6–9 is a spherical lens, other collimation devices can be implement which include: planar dielectric lens; parallel plate; etc.

Figure 10:
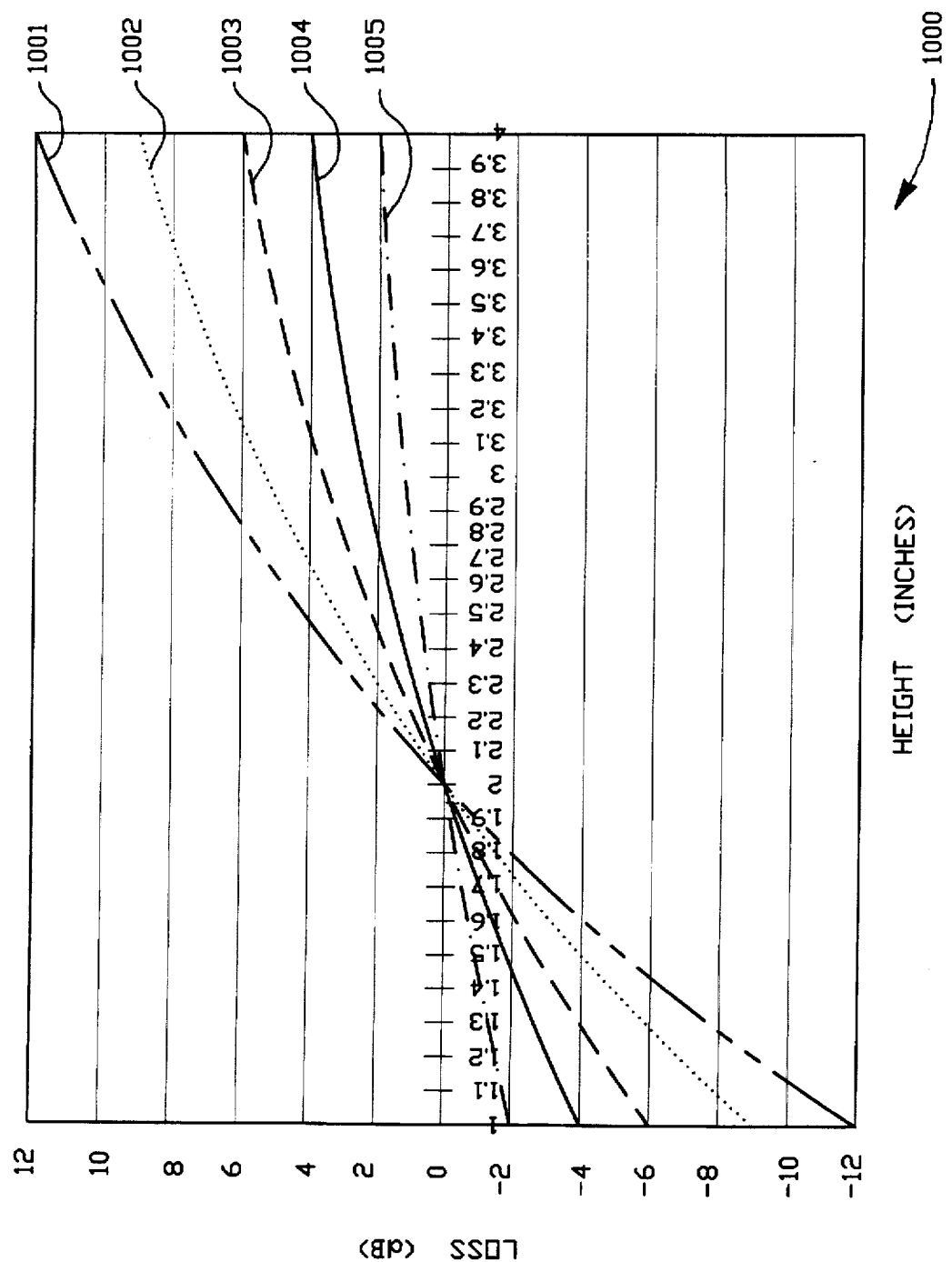
FIG. 10 is a graph showing space loss as a function of distance for conventional ground penetrating radar antennas as compared to space loss for collimated beam antennas.

FIG. 10 shows a graph 1000 plotting radar space loss as a function of radar to target distance. Line 1001 plots a 12 dB/octave space loss, as obtained by conventional ground penetrating radar antennas, (dipoles, spirals, horns, log periodic, etc.). The existence of buried mines with thin wire prongs that extend above the surface of the earth (Valmara mine) encourages the mine detector's operator to scan the mine detection system above the surface by at least 2 inches. That is as the conventional ground penetrating radar antenna height is increased from two inches to four inches above the ground, then the effect is a 12 dB decrease in the radar signal, and the effect of decreasing the distance from two to one inch is a 12 dB increase in the radar signal. This is because the conventional antennas (dipoles, spirals, horns, log periodic, etc.) used on all ground penetrating radar systems known to the inventor, radiate a spherical wave front. Therefore, the strength of the radar return signal diminishes at a rate of $1/R^4$ when R is the distance between the radar antenna and the source of reflection. Any change in the distance between the radar antenna and the ground, either due to an undulating ground surface, an operator's motion or a carrier vehicle's motion will cause this loss to change. In addition, the higher the antenna is away from the ground, the lower the radar's sensitivity. Reducing the antenna height ¼ inch results in a 2.3 dB decrease in loss resulting in a signal increase of 2.3 dB. Similarly, increasing the antenna height ¼ inch results in a 2 dB increase in loss resulting in a signal decrease of 2 dB. The signal fluctuations caused by the changes in the loss induced by fluctuations in the antenna to ground distance (loss modulation) are on the same order of magnitude as the buried mine modulation of the reflected background signal. Therefore, loss modulation decreases the radar's mine detection sensitivity. The benefits of reducing the space loss from 12 dB per octave ($1/R^4$), line 1001 to a lower value of 9 dB per octave, line 1002, 6 dB per octave, line 1003, 4 dB per octave, line 1004, and 2 dB per octave, line 1005, can be seen from FIG. 10. The inventor's use of the collimation lens has resulted in space loss reductions consistent with lines 1004 and 1005. It is believed that even further reductions in space loss change over distance will be possible with further development.

It is to be understood that the present invention is not limited to the embodiments described above, but encompasses any and all embodiments within the scope of the following claims.

I claim:

1. A mine detection system comprising:
   a wand having a first end and an opposite second end;
   a housing mounted onto said first end of said wand;
   a signal processor supported by said wand;
   a ground penetrating radar system in communication with said signal processor, said radar system including a transmitter, a receiver, and an antenna, said antenna having a first field of view; and
   a metal detector system in communication with said signal processor, said metal detector system including metal detector coils, said metal detector coils having a second field of view;
   said antenna and said metal detector coils being contained within said housing, said metal detector coils concentrically surrounding said antenna.

2. The mine detection system according to claim 1, wherein said first field of view of said antenna is substantially similar to said second field of view of said metal detector coils.

3. The mine detection system according to claim 1, wherein said antenna is selected from the group consisting of co-polarized, cross polarized, dual polarized, circularly polarized, and combinations thereof.

4. The mine detection system according to claim 1, wherein said first field of view of said antenna is offset from said second field of view of said metal detector coils by a predetermined angle.

5. The mine detection system according to claim 1, wherein said radar system is selected from the group consisting of stepped continuous wave, impulse, pulse, swept FM, continuous wave, monostatic, bistatic, balance bridge and combinations thereof.

6. A mine detection system comprising:
   a wand having a first end and an opposite second end;
   a housing mounted onto said first end of said wand;
   a signal processor supported by said wand;
   a ground penetrating radar system in communication with said signal processor, said radar system including a transmitter, a receiver, and an antenna, said antenna being contained within said housing and including an antenna feed and a collimation lens for producing a collimated beam, said antenna feed being mounted onto said lens; and
   a metal detector system in communication with said signal processor, said metal detector system including metal detector coils contained within said housing.

7. The mine detection system according to claim 6, wherein said antenna is selected from the group consisting of co-polarized, cross polarized, dual polarized, circularly polarized, and combinations thereof.

8. The mine detection system according to claim 6, further including a lens support and spacer contained within said housing for supporting said lens.

9. The mine detection system according to claim 6, wherein said radar system is selected from the group consisting of stepped continuous wave, impulse, pulse, swept FM, continuous wave, monostatic, bistatic, balance bridge and combinations thereof.

10. The mine detection system according to claim 6, wherein said collimation lens is spherical.

11. The mine detection system according to claim 10, wherein said antenna feed is mounted onto said spherical lens at an angle offset from vertical.

12. The mine detection system according to claim 11, further including a radiometer in communication with said signal processor and said antenna feed.

13. The mine detection system according to claim 10, wherein two antenna feeds are mounted onto said lens.

14. The mine detection system according to claim 13, wherein said two antenna feeds are configured to operate within identical frequency bands.

15. The mine detection system according to claim 13, wherein said two antenna feeds are configured to operate in different frequency bands for increasing operational bandwidth of said radar system.

16. The mine detection system according to claim 10, wherein three antenna feeds are mounted onto said lens.

17. The mine detection system according to claim 16, wherein said three antenna feeds are configured to operate within identical frequency bands.

18. The mine detection system according to claim 16, wherein said three antenna feeds are configured to operate in different frequency bands for increasing operational bandwidth of said radar system.

19. The mine detection system according to claim 16, including a radiometer utilizing said three antenna feeds to produce an array of contiguous beams perpendicular to a scan direction.

20. An object detection system comprising a ground penetrating radar system, a metal detector system, a radiometer and a multi-sensor module including at least one radar antenna and metal detector coils, and wherein:

said radar antenna includes at least three antenna feeds and a spherical lens for producing a collimated beam;

said metal detector coils and said radar antenna are co-boresighted;

said radiometer utilizes at least two antenna feeds of said at least three antenna feeds to produce an array of contiguous beams perpendicular to a scan direction; and said at least two antenna feeds are mounted on said spherical lens at a point offset from vertical by a predetermined angle.

\* \* \* \* \*